Patented Aug. 26, 1941

2,253,755

UNITED STATES PATENT OFFICE 2,253,755

ABSORPTION

Gilbert W. Brant, Buffalo, N. Y., assignor to E. I. du Pont de Nemours & Company, Wilmington, Del., a corporation of Delaware No Drawing. Application August 1, 1939, Serial No. 287,748

5 Claims. (Cl. 210—42.5)

This invention relates to the dehydration of organic solvents, and more particularly to improved methods of drying hygroscopic liquids, especially mixtures containing ethyl alcohol.

Certain processes, for example, lacquering, require, for economy, the recovery of large quantities of organic liquid solvents. The recovery liquids which, in the course of operations, have been contaminated or mixed with water must, in general, be dehydrated before use. This dehydration in the case of solvents forming so-called constant-boiling mixtures with water cannot be accomplished by fractional distillation.

The dehydration of certain highly hygroscopic organic solvents to a water content less than that which can be obtained by fractional distillation has, in the past, been very difficult. Furthermore, the methods and processes used heretofore have not been adaptable to repetitive or cyclic treatment of large quantities of material.

The dehydration of ethyl alcohol will serve as a convenient example. To remove water below a concentration of 5%, it is well known to treat the aqueous alcohol with quick lime. Upon standing for a sufficient time, the water present in the alcohol reacts with the calcium oxide to form calcium hydroxide which is then removed from the liquid by distillation. Such a process is strictly a batch process in which the calcium hydroxide resulting from a dehydrating treatment is removed and replaced by fresh calcium oxide before further drying can be accomplished; it is not practicable to regenerate the calcium hydroxide.

In place of calcium oxide, it is possible to use a number of materials which are available upon the market as dehydrating agents, such, for example, as calcium chloride, aluminum oxide, anhydrous calcium sulfate, etc. Not only is it very difficult to regenerate the drying materials, but most of them are in the form of powders, or in the course of operation are reduced to powders, which then become very difficult to handle in circulating apparatus, filters, etc. Then, too, the materials decreptitate to form closely packed powders which prevent the free circulation of the liquids being dehydrated. Furthermore, elaborate and expensive filters must be used in order to remove all material from the liquid.

Not only is it difficult to remove the water from highly hygroscopic materials such as alcohol, but it becomes a very real problem to remove the last traces of moisture, whether in a suspended or dissolved state, from certain hydrocarbons, such as gasolines, esters such as ethyl acetate, etc.

While it is recognized that methods exist for the dehydration of nearly all liquids having any commercial importance, and that all such liquids may be dehydrated to any desired degree, the methods employed are very frequently tedious and expensive and badly suited to processing large quantities of material on an economic scale. It is one thing to accomplish a given result in the laboratory on a small scale where time and expense are of relatively small importance, and another to accomplish the same result on a large scale at a minimum of expense and under conditions which cannot be closely supervised or controlled.

It is, therefore, an object of this invention to provide improved methods of dehydrating organic liquids. It is a further object to provide means of readily removing the last traces of moisture from such liquids. It is a still further object to provide a simple and satisfactory cyclic process for dehydrating such liquids which will not contaminate the desired product. It is a still further object to accomplish these results at a negligible cost. A general advance in the art, and other objects which will appear hereinafter, are also contemplated.

The objects of this invention may, in general, be obtained by treating an organic liquid containing suspended or dissolved water with regenerated cellulose. Where it is desired to treat large quantities of the organic liquid, the absorbent material is intermittently dried by being blown with warm air of low humidity.

The present discovery was indeed surprising because it was not known that thoroughly dried and dehydrated regenerated cellulose showed this strong affinity for water. The affinity is comparable to, and often superior to, the affinity toward water shown by well known dehydrating agents such as calcium chloride and phosphorus pentoxide.

This affinity for water is shown by the ease and the extreme facility with which this cellulosic product will absorb water from liquid in which it is held either in a suspended or dissolved form.

It has now been found that a major improvement may be made over the absorption methods heretofore employed by replacing the better known dehydrating agents such as calcium chloride, phosphorus pentoxide and various commercial products known as anhydrous calcium sulfate, etc., with regenerated cellulose. Forms of cellulose suitable for this purpose have been found to be those which have undergone an alkali treatment, such as cellulose which has been regenerated from the well known alkali solutions, whether made by the viscose or the cuprammonium processes. Cellulosic fibers which have been only superficially treated with alkali, such as by the mercerization process, are also effective. Several methods of applying the invention will be shown in more detail by the following examples.

Example I

It was desired to reduce to 0.001% the water content of benzene having initially a water content of 0.07%. This was readily accomplished by passage of the liquid through a bed of regenerated cellulose fiber 60 inches thick and of 12 square feet cross-section at the approximate rate of 15 gallons per minute. Prior to this treatment of the solvent, the cellulosic bed had been thoroughly dried by circulating therethrough air at a temperature of 110° C.

Under the conditions of treatment, the cellulosic bed which contained 1000 pounds of material absorbed approximately 15 pounds of water from 20,000 pounds of the solvent. After treating 20,000 pounds of the solvent, the cellulosic absorbent bed was thoroughly drained and blown with drying air as was done previously in order to reduce the water content of the cellulose to the previous minimum. More solvent was then passed through the cellulosic bed, and the cycle repeated as often as required. Equivalent results were obtained with mercerized absorbent cotton.

For greater ease and economy of operation, any of the well known systems of cyclic absorption may be employed, for example, two or more absorbent units may be used so that one unit may be dehydrating a solvent, while the other unit is being dried out and put into condition for dehydration of a further quantity of the solvent. The solvent is, therefore, alternately flowed through first one unit and then the other.

Example II

A mixture of solvents recovered from a typical lacquering process has the following composition:

|   | Per cent |
|---|---|
| Ethyl alcohol | 60 |
| Ethyl acetate | 25 |
| Toluene | 4.5 |
| Acetone | 3 |
| Water | 7.5 |

This solvent mixture was passed through a column packed with a 48 inch deep bed of well dried viscose rayon fibers, cut to an approximate length of 1½ inches. The bed was of such a size that it contained 1000 pounds of the rayon material. The first 500 pounds of solvent which passed through this bed is observed to have a water content of 0.1% or less. As the treatment was continued, a small but increasing amount of water came through in the solvent. As the purpose of the process in this particular instance is to reduce the water content to a satisfactory level, rather than to completely remove water, further quantities of the solvent mixture were treated until the over-all moisture content of the treated solvent mixture was found to be 2.8%; this occurred when 2000 pounds of the solvent mixture had been treated by 1000 pounds of the regenerated cellulose packing material.

The table below gives the cumulative values obtained in a particular instance with viscose rayon absorbent material. These values indicate the water content to be expected in the total run, if cut-off is made at the indicated points of the cycle. The figures are in pounds of solvent mixture containing 7½% water per 1000 pounds of packing.

Table

| Solvent dried per cycle | Water content, per cent |
|---|---|
| 500 lbs | 0 |
| 1000 lbs | 0.8 |
| 1500 lbs | 1.9 |
| 2000 lbs | 2.8 |
| 2500 lbs | 3.6 |
| 3000 lbs.* | 4.2 |

*At this point, a momentary sample has a water content equal to the initial content of the solvent, while the water content of the packing is about 10% when averaged over the bed.

In operating the process, the following steps are followed:

1. Passage of solvent mixture downward through the dry packing until a predetermined amount has been collected (2,000 pounds).
2. Drainage of the column and displacement downward of loosely retained solvent by means of a slight pressure of air or inert gas.
3. Removal of remaining solvent upward to a condenser by means of live steam.
4. Removal of water upward from the packing by means of heated air until the weight of the packing remains constant. For this step, it is preferred to use air of a temperature of 105° C. to 110° C. If found desirable, the air can be passed through the bed at reduced pressure, in which case a lower temperature can be employed in order to give the same degree of drying.

This treatment cycle can be repeated as often as required to treat a given amount of solvent mixture. Two or more solvent beds may be employed such that one is being dried while the other treats solvent mixture. Such systems of tandem treatment are well known in the adsorber art.

Example III

Fuel gasoline, containing 0.007% of water is passed through an absorber bed similar to that of Example II and according to the operational steps described in Example II. It was found that 1000 pounds of viscose rayon would reduce the moisture content of 60,000 pounds of gasoline to less than 0.0005%. The gasoline so treated was found to give greatly improved performance in internal combustion engines, especially those used in airplanes. Furthermore, such gasoline was found not to clog fuel lines, etc., when used at temperatures below the freezing point of water, especially in the wintertime in northern climates and for high altitude flying.

Example IV

Sheets of regenerated cellulose were run through embossing rolls which provided the sheets with corrugations or other suitable surface irregularities. A number of such sheets were then rolled into a bundle and thoroughly dried by baking in an oven at approximately 110° C. Such dehydrated sheets were then immediately wrapped and sealed. Moistureproof wrapping material, such as well known varieties of moistureproof regenerated cellulose film (see United States Patent No. 1,737,187, Charch and Prindle), metal containers, and the like, were satisfactory coverings during storage. The cartridges so prepared are suitable, upon removing the wrapper, for immersion in containers or organic liquids such as gasoline, for the removal of moisture and dissolved or suspended water. For example, a cartridge containing one pound of regenerated cellulose may be introduced into a container of 10 gallons of ordinary commercial grade of gasoline and allowed to stand with occasional agitation for a period of one hour. Gasoline so treated will be found to have had its moisture content reduced to approximately less than 0.0005%.

EXAMPLE V

Two hundred parts of ethyl acetate containing 0.35% water was shaken with 100 parts of dried rayon. After a few minutes, the solvent was poured off and the water content of the ethyl acetate was determined to be 0.01%.

Dehydrating agents may include regenerated cellulose prepared by the viscose, cuprammonium, and like processes. The regenerated cellulose may be of a filamentary sort which, optionally, may be cut into short lengths (staple), in the form of sheets, ribbons, etc., or it may be chopped or ground to various degrees of fineness. The cellulose may also be in the form of fibrous matted sheets, fibrous shredded flakes, loose masses of fiber, and the like.

Liquids which may be dehydrated by this process include the well known organic solvents such as the alcohols, methanol, ethanol, propanol, etc., esters such as ethyl acetate, butyl acetate, etc., hydrocarbons such as represented in the usual commercial gasoline, aromatic mixtures known as commercial gasoline, aromatic derivatives such as toluene, etc. The limitations upon the materials treated appear to be that they shall have no action upon the cellulose, and that they are liquid and may be treated at ordinary temperature.

The various methods of processing are well known in the absorber art, some types of which are represented in the examples above.

Use of the forms of cellulose described in the instant invention and with the treatment outlined gives a greater degree of dehydration than is obtainable by the use of other well known dehydrating agents. This is particularly true when these materials are to be used as dehydrating agents for liquids such as organic solvents.

Methods of the instant invention are better adapted to drying such liquid materials and do so with greater efficiency and simplification of operation.

By the use of the process of the instant invention it is possible to reduce the moisture content of liquids below the value customarily obtained in the past by any commercial process of dehydration.

The instant invention provides an extremely convenient and efficient method of dehydrating such highly hygroscopic materials as alcohol and also of dehydrating mixtures of solvents containing hygroscopic materials.

It is possible by the instant invention to completely remove the last traces of moisture in fuel gasoline by a simple and economical method, thus producing a gasoline which is better suited to operation in internal combustion engines.

The instant invention provides a process of dehydrating liquids which, in addition to being efficient and well adapted to cyclic operation, is very inexpensive and economical.

As many apparently widely different embodiments of this invention may be made without departing from the spirit and scope thereof, it is to be understood that I do not limit myself to the specific embodiments thereof except as defined in the appended claims.

I claim:

1. In the process of removing water from ethyl alcohol, the steps of mixing the alcohol and regenerated cellulose maintaining them in intimate contact until the water content is reduced below 0.1% by weight and then separating the dried alcohol in the liquid state from the regenerated cellulose.

2. The process which comprises passing an organic solvent mixture containing a major proportion of ethyl alcohol and ethyl acetate and a minor proportion of toluene, acetone and water into contact with well dried regenerated cellulose, maintaining them in intimate contact until the water content is reduced below 0.1% by weight and then separating the dried alcohol in the liquid state from the regenerated cellulose.

3. The process of removing water from ethyl alcohol which comprises mixing ethyl alcohol containing water with regenerated cellulose maintaining them in intimate contact until the water content is reduced below 0.1% by weight and then separating the dried alcohol in the liquid state from the regenerated cellulose.

4. A process which comprises passing solvent ethyl alcohol contaminated with water downwardly through a bed composed of dry regenerated cellulose fibers until the water content of the alcohol has been reduced below 0.1% by weight, and collecting the dried ethyl alcohol for use as a solvent, removing the loosely retained alcohol from the regenerated cellulose bed by passing a current of air downwardly through the bed under a slight pressure, removing additional remaining alcohol by passing a current of live steam upwardly through the bed and preparing the bed for further reuse by removing the water therefrom by passing air heated to a temperature of 105 to 110° C. therethrough until the weight of the bed remains constant.

5. A process as set forth in claim 3 wherein said solvent ethyl alcohol consists of a major proportion of ethyl alcohol and ethyl acetate and a minor proportion of toluene, acetone and water.

GILBERT W. BRANT.